United States Patent Office 3,439,788
Patented Apr. 22, 1969

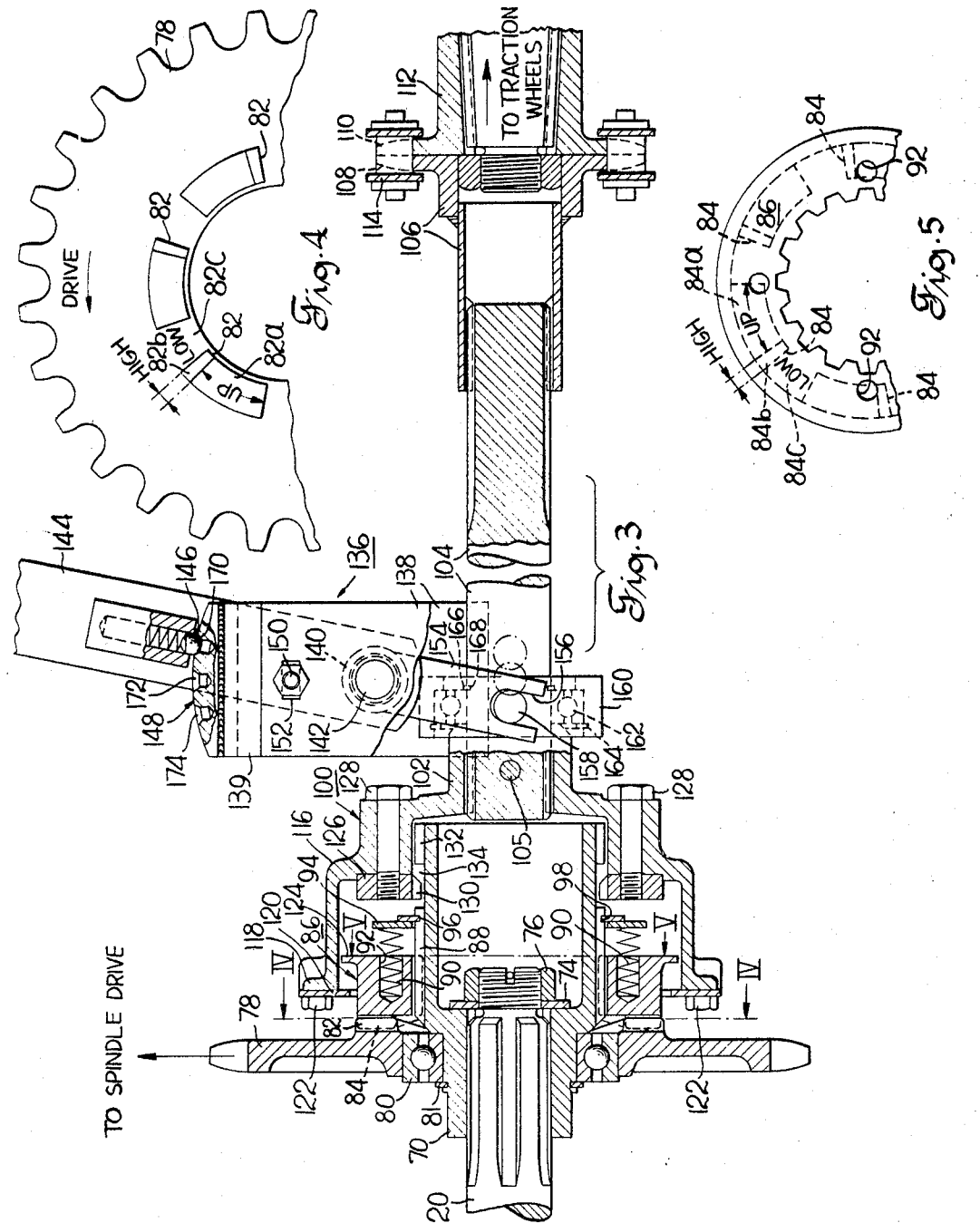

3,439,788
CLUTCH ENABLING SIMULTANEOUS CONTROL OF TWO DRIVEN SHAFTS OR SELECTIVE CONTROL OF EITHER OF SAID SHAFTS
Rector C. Fergason, Gadsden, Ala., assignor to Allis-Chalmers Manufacturing Company, Milwaukee, Wis.
Filed Oct. 18, 1967, Ser. No. 676,349
Int. Cl. F16d 47/04, 21/02
U.S. Cl. 192—48.6         15 Claims

ABSTRACT OF THE DISCLOSURE

A power transmission and control mechanism therefor for harvesting machines or the like, such as cotton harvesters, in which a three way shifting arrangement selectively provides (1) a drive connection only to the harvesting units such as the cotton picking spindles; (2) a drive connection to the harvesting units and also to the differential of the propulsion unit; and (3) a drive connection only to the differential of the propulsion unit.

Power to the harvesting units is transmitted through a one way clutch which transmits power only on the forward movement of the harvesting machine.

---

This invention relates to harvesters, such as cotton harvesters and the like, and more particularly to an improved power transmission and control mechanism therefor for harvesters.

The invention will be described as embodied in a cotton harvesting machine but is equally applicable to other types of harvesting machines, particularly, harvesting machines in which the harvesting units such as cotton picking spindles or the like must be synchronized with the ground speed.

In conventional cotton harvesters, control means are normally provided to direct the transmission of power from the tractor transmission to the cotton picking units and to the differential drive for the tractor so that the cotton picking units and differential can be selectively driven or both can be operated simultaneously. The term "tractor" is used in this context to designate the propulsion unit of the self-propelled harvester. In the past, these transmission control devices have been complicated in structure, requiring a different drive sprocket for each speed, which presented problems in maintaining the picking units synchronized with ground speed. Difficulty was also experienced in providing satisfactory means for preventing the cotton picking units from turning backward when the harvester rolled back on a slope or when the tractor transmission is operated in reverse.

Accordingly, it is an object of the present invention to provide an improved control means for the power transmission of harvester, such as cotton harvesters or the like.

It is another object of the invention to provide lever control means which permits shifting the transmission into a harvesting or picking unit drive only, a differential drive only for the propulsion of the harvesting machine, or both harvesting or picking unit and differential drive.

It is a further object of the invention to provide a transmission control for harvesting machines in which the harvesting or picking units are synchronized with ground speed at any transmission speed.

It is a still further object of the invention to provide a transmission control for harvesters, such as cotton harvesters or the like, which prevents reverse operation of harvesting or picking units when the transmission is put in reverse or the harvester rolls backward on a grade.

In achievement of these objectives, there is provided in accordance with an embodiment of this invention a power transmission and control mechanism therefor for harvesting machines or the like, such as cotton harvesters, in which a three way shifting arrangement selectively provides (1) a drive connection only to the harvesting units such as the cotton picking spindles; (2) a drive connection to the harvesting units and also to the differential of the propulsion unit; and (3) a drive connection only to the differential of the propulsion unit. Power to the harvesting units is transmitted through a one way clutch which transmits power only on the forward movement of the harvesting machine.

Further objects and advantages of the invention will become apparent from the following description taken in conjunction with the accompanying drawings in which:

FIG. 3 is a view in longitudinal cross section through the control for power transmission to the cotton picking units, to the differential drive, or to both;

FIG. 4 is a fragmentary elevation view taken along line IV—IV of FIG. 3 of the sprocket showing the clutch teeth thereon; and FIG. 5 is a fragmentary elevation view taken along line V—V of FIG. 3 of the clutch which drivingly engages the sprocket of FIG. 4, showing the clutch teeth thereof in facing relation to the clutch teeth of the sprocket.

Figure 1:
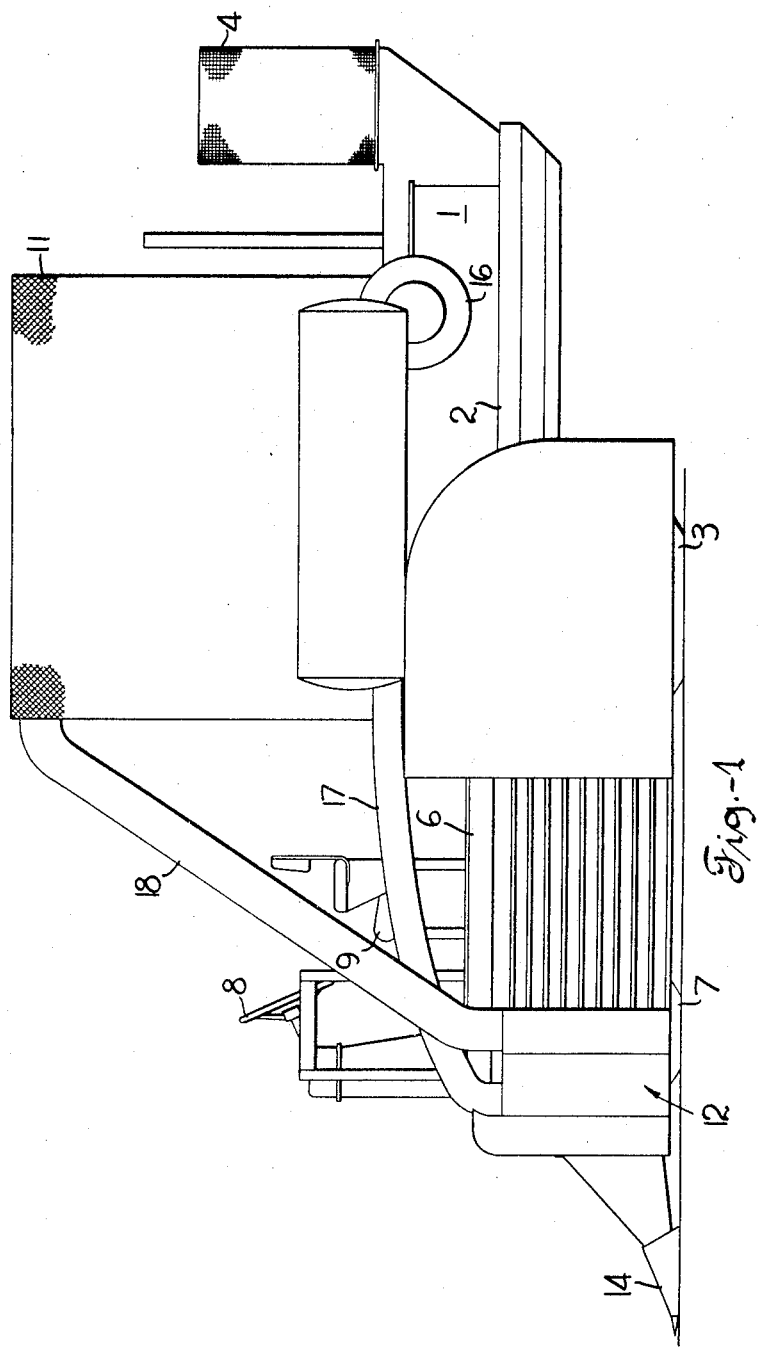
FIG. 1 is a side elevation view of a drum type cotton harvester.
Figure 2:
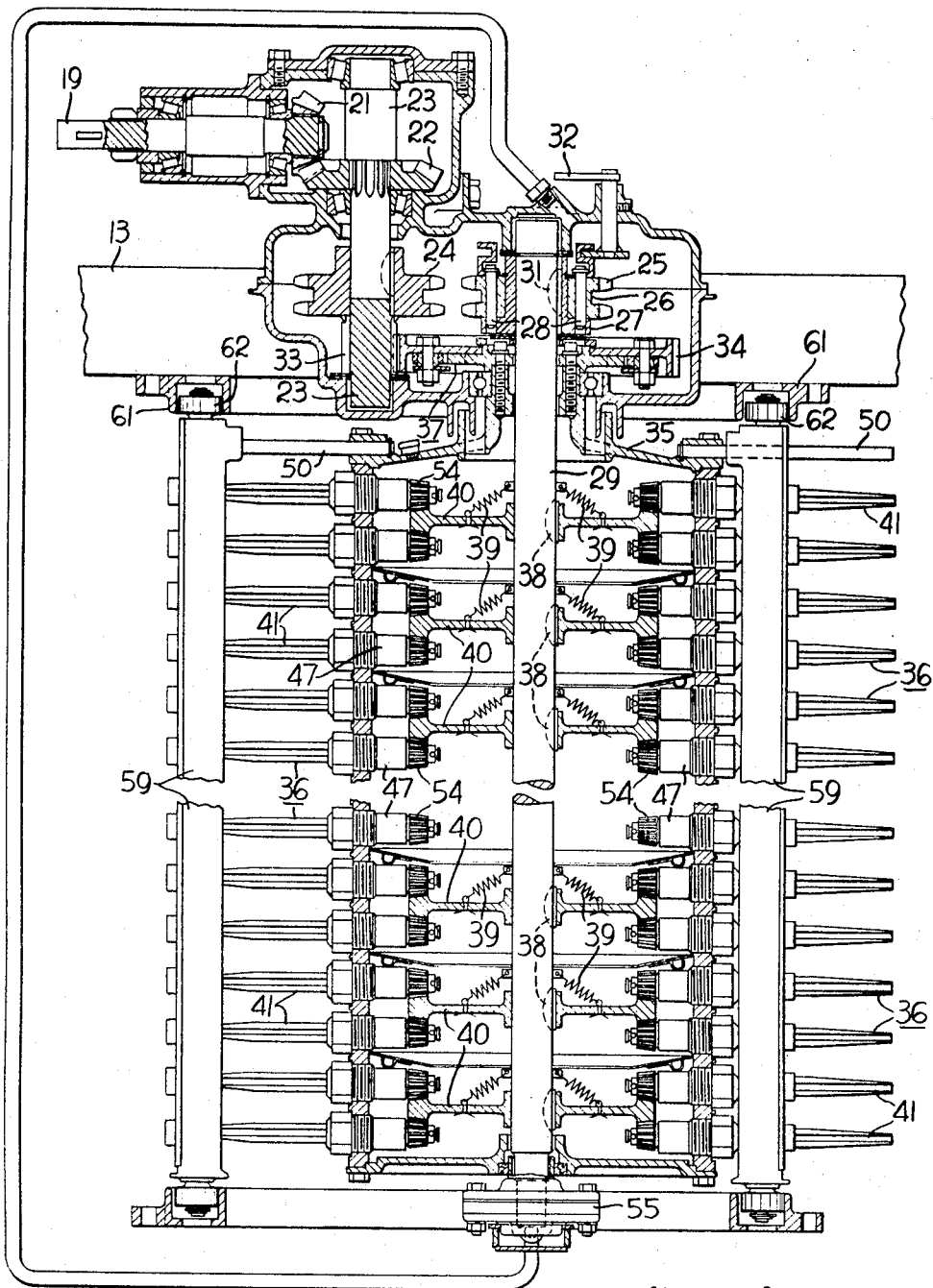
FIG. 2 is a view in vertical cross section of a portion of a drum type cotton harvester embodying the invention.

Referring to FIG. 1, the cotton harvester embodying the invention consists of an engine 1 joined to an axle housing (not shown) and supported thereby as a cantilever beam. A frame member 2 supports engine 1 from the axle housing. A pair of laterally spaced traction wheels 3 (only one is shown) are operatively connected to opposite ends of the axle housing in a conventional manner. Engine 1 is provided with an air intake cleaning screen 4 which is carried by the engine. A forwardly extending frame 6 is attached at its rear end on the axle housing. The forward end of frame 6 is supported on a dirigible wheel 7 which is operatively connected to steering wheel 8 carried by the front end of frame 6. An operator's seat 9 is carried by frame 6 rearwardly of the steering wheel 8. A picked cotton receiving basket 11 is carried on frame members 6 and 2 rearwardly of operator's seat 9. Cotton picker assemblies 12 are mounted on each side of the forward end of frame 6. These assemblies are carried by a subframe 13 (see FIG. 2) which is adjustably connected to frame 6 for vertical movement relative thereto. The forward end of assemblies 12 (see FIG. 1) are provided with plant dividers 14 which guide cotton plants into contact with cotton pickers which are positioned just rearwardly of the plant dividers. If further details of the stalk dividers are desired, reference may be had to U.S. patent application Ser. No. 456,399, filed May 17, 1965 for Plant Divider for Harvesters. Frame 2 supports a blower 16 which is provided with a duct 17 which delivers pressurized air to picking assembly 12 and a cotton delivering duct 18 for depositing picked cotton into basket 11.

Engine 1 is provided with a power output shaft 20 (FIG. 3) which is operatively connected to shaft 19 of picking unit 12 (see FIG. 2), through a transmission and control mechanism shown in FIG. 3 to be described more fully hereinafter. A gear 21 is attached to shaft 19 for rotation therewith and gear 21 is drivingly engaged with gear 22 attached to shaft 23. A double sprocket 24 attached to shaft 23 is drivingly connected to double sprocket 25 by means of chains (not shown). Double sprocket 25 includes a center portion 27 upon which the outer portion 26 is journaled. These two portions 26 and 27 are selectively joined together by means of pins 28. Center portion 27 is keyed to shaft 29 for rotation therewith by conventional means such as half-moon key 31. Pins 28 can be raised vertically by raising handle 32 and the mechanism connected therewith to interrupt the driving connection between portions 26 and 27.

Beneath sprocket 24 a gear 33 is attached to shaft 23. Gear 33 is drivingly engaged with a gear 34 which surrounds shaft 29 and which rotates relative thereto and gear 34 is attached to drum 35 for rotation therewith. A ratchet mechanism 37 is interposed between drum 35 and gear 34 so that drum 35 can only be driven in one direction. If driven in the opposite direction, the ratchet mechanism interrupts the drive.

Reference numeral 35 designates the drum or cylinder of a cotton picking machine and which drum carries a plurality of cotton picking assemblies 36. Each picking assembly 36 includes a picking spindle 41. Pairs of horizontal rows of spindles 41 are driven by a double bevel gear 40 secured to drive shaft 29 by means of keys 38, the radially inner end of each spindle being provided with a beveled pinion gear 54 which mates with gear 40. Springs 39 suspend gears 40 from shaft 29 and half-moon keys 38 permit gears 40 to be self-aligning. By not having the weight of the gears supported on the lower of the pair of spindles, backlash problems in the gears are eliminated.

The spindle assembly 36 (see FIG. 2) includes a picking spindle 41 having an inner shank portion and a tapered picker portion. A tubular support 47 is assembled on the spindle shank portion. Beveled pinion gear 54 is positioned on the after end of spindle 41 and drives the spindle by means of a frangible roll pin with such roll pin being received in aligned openings in the spindle and gear. The outer surface of tubular support 47 is threaded so that spindle assemblies 36 can be securely received by corresponding threaded openings in the drum 35. Oil for lubrication of the gears and bearings is furnished by pump 55 (see FIG. 2) which pumps oil to the upper portion of the drum, thereafter permitting same to return to the pump by action of gravity. Pump 55 is operatively connected to the lower end of shaft 29 for rotation therewith.

A stripper bar or slat 59 (FIG. 2) is associated with each vertical row of spindles on the drum 35 and is supported from the drum by means of radial rods 50 upon which the slats 59 are slidably mounted. A pair of vertically spaced stationary cam tracks 61 carried by means of frame 13 at the upper end and by means (not shown) at the lower end are arranged to receive rollers 62 carried by the stripper bars and to cause movement of the stripper bar longitudinally of the spindles during rotation of the drum.

For further details of the spindle assembly and of the stripper mechanism with which it cooperates, reference is made to my United States patent application Ser. No. 656,811 filed July 28, 1967, for a Cotton Harvester.

Referring now to FIG. 3, a drive hub 70 is splined to the tractor transmission drive shaft 20 and is held thereon by means of a washer 74 and a retaining nut 76. A drive sprocket 78 for the cotton picking spindles is journaled on the hub 70 by means of an antifriction bearing 80 which is axially secured on hub 70 by snap ring 81. Sprocket 78 drives the harvester cotton picking units by any suitable chain and gear drive arrangement, including the shaft 19 and associated gearing shown in FIG. 2 of the drawings.

The outer face or righthand face, with respect to the view shown in FIG. 3, of sprocket 78 is provided with integral jaw clutch teeth 82 which mesh with similar teeth 84 on the clutch member generally indicated as 86. Clutch member 86 is slidably mounted on the splined portion 88 of drive hub 70. Teeth 84 on the clutch member 86 are urged into driving engagement with the teeth 82 on sprocket 78 by means of four compression springs 90. One end of the springs 90 are received in the openings 92 in clutch member 86, the opposite end of the springs abutting a washer 94 held in place by a snap ring 96 received by groove 98 in hub 70.

The jaw clutch teeth 82 of the sprocket 78 and the jaw clutch teeth 84 of the clutch 86 are so contoured and related to each other as to establish a driving connection to the clutch 86 on the forward movement of the propulsion transmission and corresponding rotation of input shaft 20.

Each of the teeth 82, 84 is provided with an inclined "up" surface 82A, 84A, respectively, terminating in a flat high portion 82B, 84B, respectively. A flat "low" surface 82C, 84C, respectively, separates the high portion 82B or 84B of each tooth from the beginning of the inclined "up" surface 82A, 84A of the adjacent tooth.

The driving engagement of clutch 86 with respect to sprocket 78 is accomplished by engagement of the radial edges bounding the respective "high" portions 82B, 84B of the respective teeth 82, 84. Reverse movement of the transmission causes the inclined surfaces 82A, 84A of teeth 82, 84 to slip over or "ratchet" with respect to each other whereby reverse motion is not imparted to the sprocket 78 and hence to the cotton picking units when the input shaft 20 rotates in a direction corresponding to the reverse motion of the harvester unit.

A bell-shaped differential drive housing member generally indicated at 100 has a hub portion 102 splined to the forward end of differential drive shaft 104 and secured thereto by pin 105. The differential drive shaft 104 is coaxially aligned with the tractor transmission output shaft 20 and has its rearward splined end slidably received by a splined coupling sleeve assembly generally indicated as 106. The flanged end of coupling 106 has half thickness sprocket teeth 108 formed thereon, with similar half sprocket teeth 110 formed on the contiguous end of shaft 112 wihch drives the input gear of the differential for the traction wheels 3 of the cotton harvester. The two half sprockets 108 and 110 are coupled together by chain member 114, whereby rotation of shaft 104 and coupling sleeve 106 is transmitted to shaft 112.

The differential drive housing 100 extends forwardly to receive the drive hub 70 and the clutch member 86 within its bell portion 116. The forward annular face of the bell portion 116 is provided with two sets of diametrically opposite bosses 118 to which radially inwardly projecting abutment members 120 are secured by cap screws 122 or the like. Axial movement of differential drive shaft 104 and the differential drive housing 100 connected thereto will cause abutment member 120 to contact the flange 124 formed as an integral part of the clutch member 86. Continued axial movement of the differential drive housing 100 to the right with respect to the view shown in FIG. 3 will slide the clutch member 86 rearwardly or to the right with respect to the view shown in FIG. 3 against the force of compression springs 90, causing the jaw clutch teeth 82 of the sprocket 78 to become disengaged from the jaw clutch teeth 84 of the clutch 86, thereby interrupting the drive to the cotton picking units through the clutch 86 and sprocket 78.

A clutch member 126 is rigidly secured inside bell portion 116 of the differential drive housing 100 by means of screws 128. The clutch member 126 includes teeth 130 which mesh with teeth 132 on hub 70 to drivingly connect the input drive from shaft 20 with the differential drive housing 100 and connected differential drive shaft 104 when differential drive housing 100 is in a predetermined axial position. The teeth 130 on the clutch member 126 of differential drive housing 100 are separated by an axial space 134 from the teeth 132 on the hub 70 so that when differential drive housing 100 is in the position shown in FIG. 3 the teeth 130 are separated from the teeth 132 so that there is no driving relation between input shaft 20 and differential drive housing 100 with its connected output shaft 104.

A manually operated lever assembly, generally indicated at 136, is provided to impart axial movement to differential drive shaft 104 and associated drive housing 100. Lever assembly 136 comprises a pair of plates 138 rigidly secured to the harvester frame and interconnected by a tubular shaft 140 rotatably received on stub journals 142 which are rigidly welded to plates 138. A hand lever 144 is rigidly secured, as by welding, to one end of tubular shaft 140 and is provided with a ball detent mechanism 146 adapted to engage a rack assembly 148 which is rigidly attached, as by welding to a plate 139 which in turn is adjustably secured to one of the plates 138 by means of bolt 150. Bolt 150 is received in slot 152 in plate 138 to permit axial adjustment of rack assembly 148 relaive to hand lever 144 to correlate the axial position of shaft 104 to the corresponding detent notch in the rack assembly.

The tubular shaft 140 is provided with downwardly extending rigid arms 154 which are apertured or slotted at 156 to pivotally receive the trunnions 158 of a shifting collar 160. Collar 160 is provided with a bearing 162 which is held therein by snap ring 164. The collar 160 with bearing 162 is assembled on the differential drive shaft 104 and axially secured between the end of the drive housing portion 102 and the snap ring 166 received in groove 168 of shaft 104.

When the hand lever 144 is actuated into any one of its three detented positions the shifting collar 160 will axially move the differential drive shaft 104 and associated differential drive housing member 100 into the desired drive arrangement.

When hand lever 144 is in detent notch 170, as shown in full line in FIG. 3, the differential drive shaft 104 and housing 100 associated therewith have been moved to the extreme forward position or to the left, as shown in FIG. 3, the jaw clutch teeth 84 of clutch 86 engaging jaw clutch teeth 82 of sprocket 78 whereby to drive sprocket 78 and the cotton picking spindles from the input shaft 20. In this position of the hand lever 144 the clutch teeth 130 carried by the differential drive housing 100 are disengaged from teeth 132 carried by hub 70 so that the differential drive shaft 104 is not being driven by the input shaft 20 in this position of the hand lever 144.

When the hand lever 144 is moved to the center detent notch 172, the differential drive shaft 104 is moved rearwardly or to the right with respect to the view in FIG. 3, to cause the clutch teeth 130 on housing 100 to be drivingly engaged by the teeth 132 on the end of hub 70. Also, due to the lost motion or axial spacing between abutment member 120 and the flange 124 on clutch member 86, whereby abutment member 120 does not engage flange 124 when lever 144 engages detent notch 172, clutch 86 still remains in driving engagement with sprocket 78 to cause sprocket 78 to be driven by input shaft 20.

When hand lever 144 is moved to the third detent position 174, differential drive shaft 104 is moved rearwardly or to the right with respect to the view of FIG. 3 an additional amount to cause abutment member 120 on housing 100 to engage flange 124 on clutch 86 to move clutch 86 a sufficient distance to the right or rearwardly with respect to the view of FIG. 3 to disengage clutch 86 from its driving relation with sprocket 78, thereby disconnecting sprocket 78 and the cotton picking spindles associated therewith from input drive shaft 20. In this third position of hand lever 144 in which the hand lever 144 engages detent notch 174, the teeth 130 on housing 100 remain in engagement with the teeth 132 on hub 70, due to the length of the teeth 132.

It can be seen from the foregoing that there is provided in accordance with this invention an improved power transmission control for harvesting units such as cotton harvesters or the like, whereby the speed of the harvesting or picking units is synchronized with the differential drive and ground speed without requiring sprocket changes or the like. Furthermore, the one way ratchet drive to the picking units assures that reverse opertaion of the input power shaft or rolling back on a slope by the harverter will not operate the picking units in a reverse direction.

It is obvious from the foregoing description and drawings that the detailed arrangement and construction of the various elements may be modified considerably without departing from the spirit of the invention which must not be considered as limited strictly to the construction shown and described.

The embodiments of the invention in whch an exclusive property or privilege is claimed are defined as follows:

1. A power transmission and control mechanism therefor for harvesting machines or the like comprising an input shaft mounted for rotation, an output shaft in axial alignment with said input shaft, one of said shafts being mounted for axial movement relative to the other of said shafts, a drive member for harvesting units or the like rotatably mounted contiguous said input shaft, first clutch means carried by sain input shaft and axially slidable relative thereto, cooperating clutch surfaces carried by said drive member and by said first clutch means, means normally biasing said first clutch means into clutched engagement with said drive member, abutment means carried by said output shaft and effective to move said first clutch means out of engagement with said drive member, a second clutch means carried by said input shaft, cooperating clutch means carried by said output shaft, said cooperating clutch means being effective upon a predetermined relative axial movement of said input and output shafts to effect driving engagement between said second clutch means and said cooperating clutch means, whereby said output shaft is driven by said input shaft; and means for axially moving one of said shafts to a first position in which said abutment means is ineffective to move said first clutch means out of engagement with said drive member whereby said drive member is driven by said input shaft, said second clutch means and said cooperating clutch means being disengaged in said first position whereby said input shaft does not drive said output shaft; to a second position in which said abutment means is ineffective to move said first clutch means out of engagement with said drive member whereby said drive member is driven by said input shaft, and said second clutch means and said cooperating clutch means become engaged whereby to cause said input shaft to drive said output shaft; and to a third position in which said abutment means is effective to move said first clutch means out of engagement with said drive member whereby said drive member is not driven by said input shaft and said second clutch means and said cooperating clutch means are engaged.

2. A power transmission and control mechanism therefor as defined in claim 1 in which said output shaft is axially movable.

3. A power transmission and control mechanism therefor as defined in claim 1 in which said cooperating clutch surfaces carried by said drive member and by said first clutch means are effective to transmit rotary motion to said drive member in only one direction of rotation of said input shaft.

4. A power transmission and control mechanism therefor as defined in claim 1 in which said output shaft drives the differential for the traction wheels of a harvesting machine.

5. A power transmission and control mechanism therefor as defined in claim 1 in which said drive member is connected in driving relation to cotton picking spindles of a cotton harvesting machine.

6. A power transmission and control mechanism therefor as defined in claim 1 in which said drive member is a sprocket.

7. A power transmission and control mechanism therefor as defined in claim 1 comprising a control lever, means engaging said control lever with the axially movable shaft whereby to impart axial movement to said shaft, and detent means for retaining said control lever in any one of three predetermined positions.

8. A power transmision and control mechanism therefor as defined in claim 1 in which a bell-shaped housing member is carried by said output shaft.

9. A power transmission and control mechanism therefor for harvesting machines or the like comprising an input shaft mounted for rotation, hub means fixed to said input shaft for rotation therewith, an output shaft in axial alignment with said input shaft, said output shaft being mounted for axial movement, a member carried by said output shaft and telescopically movable relative to said hub means of said input shaft, a drive member for harvesting units or the like rotatably mounted contiguous said input shaft, first clutch means mounted for axial sliding movement on said hub member, cooperating clutch surfaces carried by said drive member and by said first clutch means, means normally biasing said first clutch means into engagement with the clutch surface of said drive member, abutment means carried by the telescopically movable member and effective to move said first clutch means out of engagement with said drive member, a second clutch means carried by said hub, cooperating clutch means mounted on said member carried by said output shaft, said cooperating clutch means being axially movable with said member carried by said output shaft to effect driving engagement between said second clutch means and said cooperating clutch means whereby said output shaft is driven by said input shaft; and means for axially moving said output shaft to a first position in which said abutment means is ineffective to move said first clutch means out of engagement with said drive member whereby said drive member is driven by said input shaft, said second clutch means and said cooperating clutch means being disengaged in said first position whereby said input shaft does not drive said output shaft; to a second position in which said abutment means is ineffective to move said first clutch means out of engagement with said drive member whereby said drive member is driven by said input shaft, and said second clutch means and said cooperating clutch means become engaged whereby to cause said input shaft to drive said output shaft; and to a third position in which said abutment means is effective to move said first clutch means out of engagement with said drive member whereby said drive member is not driven by said input shaft, and said second clutch means and said cooperating clutch means are engaged.

10. A power transmission and control mechanism therefor as defined in claim 9 in which said cooperating clutch surfaces carried by said drive member and by said first clutch means are effective to transmit rotary motion to said drive member in only one direction of rotation of said input shaft.

11. A power transmission and control mechanism therefor as defined in claim 9 in which said output shaft drives the differential for the traction wheels of a harvesting machine.

12. A power transmission and control mechanism therefor as defined in claim 9 in which said drive member is connected in driving relation to cotton picking spindles of a cotton harvesting machine.

13. A power transmission and control mechanism therefor as defined in claim 9 in which said drive member is a sprocket.

14. A power transmission and control mechanism therefor as defined in claim 9 comprising a control lever, means engaging said control lever with the axially movable shaft whereby to impart axial movement to said shaft, and detent means for retaining said control lever in any one of three predetermined positions.

15. A power transmission and control mechanism therefor as defined in claim 9 in which said member carried by said output shaft is a bell-shaped housing member.

References Cited
UNITED STATES PATENTS

| | | | |
|---|---|---|---|
| 1,858,700 | 5/1932 | Besonson | 192—48.8 |
| 1,865,022 | 6/1932 | Larson | 192—48.8 |
| 2,261,432 | 11/1941 | Cooke | 192—48.8 |

CARLTON R. CROYLE, *Primary Examiner.*

A. D. HERRMANN, *Assistant Examiner.*

U.S. Cl. X.R.

192—48.8